US012049968B2

(12) United States Patent
Swanger

(10) Patent No.: US 12,049,968 B2
(45) Date of Patent: Jul. 30, 2024

(54) HOSE CLAMP

(71) Applicant: Shane Swanger, Eagle Mountain, UT (US)

(72) Inventor: Shane Swanger, Eagle Mountain, UT (US)

( * ) Notice: Subject to any disclaimer, the term of this patent is extended or adjusted under 35 U.S.C. 154(b) by 32 days.

(21) Appl. No.: 17/875,232

(22) Filed: Jul. 27, 2022

(65) Prior Publication Data

US 2024/0035598 A1 Feb. 1, 2024

(51) Int. Cl.
*F16L 21/06* (2006.01)
(52) U.S. Cl.
CPC ..................... *F16L 21/06* (2013.01)
(58) Field of Classification Search
CPC . F16L 21/06; F16L 33/04; F16L 33/06; F16L 33/08; F16L 33/12; F16L 33/10
See application file for complete search history.

(56) References Cited

U.S. PATENT DOCUMENTS

| | | | | |
|---|---|---|---|---|
| 864,474 A | * | 8/1907 | Leeper | F16L 33/12 24/272 |
| 5,661,876 A | * | 9/1997 | Goldenberg | F16L 33/02 24/19 |
| 5,729,871 A | * | 3/1998 | Schulte | B65D 63/16 24/16 R |
| 6,622,347 B1 | * | 9/2003 | Cottrill | F16L 23/06 24/70 R |
| 2020/0141524 A1 | * | 5/2020 | Pearman | F16L 21/08 |
| 2021/0156407 A1 | * | 5/2021 | Kong | F16L 33/10 |

* cited by examiner

*Primary Examiner* — David Bochna
(74) *Attorney, Agent, or Firm* — Steven Rinehart

(57) ABSTRACT

An improved hose clamp is provided which incorporates a ratchet lever functionable to lock down and secure the clamp in place on a hose without need for use of screwdrivers or other implements. The ratchet lever presses forward a slider block which travels above a distal end of a collar and is affixed to a proximal end of the collar.

6 Claims, 7 Drawing Sheets

HOSE CLAMP

FIELD OF THE INVENTION

This invention relates to an improved hose clamp structure.

BACKGROUND

Description of the Related Art

Standard hose clamps have been known in the art for nearly a century. Typical hose clamps comprise an annular band or collar, formed of a metal alloy, which circumscribes a hose coupled to a cylindrical attachment body. The collar is deformed against the hose. In typical embodiments, these hose clamps are tightened using a jack screw, or threaded tightener, disposed above the band at a junction point between distal and proximal ends of the collar adapted to apply progressive clamping/tensile force to the band.

Hose clamps statically position a hose clamp in close proximity to the end of hose and resist tensile pull of the hose which would other wise separate the hose from the attachment body.

Holderless types and holder types of hose clamps are know in the art, but are both inefficient, suffering from various inefficiencies and defects including the difficulty of using an elongated screwdriver in confined engine compartments to engage the tightener and nonoptimal clamping force being applied after positioning, as well as the time needed to turn the tightener.

For this reason, operators needing to quickly attach, or detach, hose clamps are denied effective means of doing either. There exists no efficient implement in the art which overcomes these inefficiencies. An improved hose clamp is needed.

SUMMARY

From the foregoing discussion, it should be apparent that a need exists for an improved hose clamp. Beneficially, such an apparatus would be easily attached and detached.

The present invention has been developed in response to the present state of the art, and in particular, in response to the problems and needs in the art that have not yet been fully solved by currently available hose clamps. Accordingly, the present invention has been developed to provide an improved hose clamp comprising: an elongated band formed of one of a polymeric and a metal alloy deformed into a cylindrical shaped adapted to circumscribe a hose and attachment point, the band having a distal end and proximal end; a track affixed to a proximal end of the elongated band, the tracking comprising: two sidewalls within which a slider block travels; two lower protuberances jutting laterally from the track disposing within an interior recess defined by a ratchet lever, the lower protuberances forming a fulcrum; a slider block affixed to a distal end of the elongated band, the slider block forming a recess adapted to affix to the distal end of the elongated band, the slider block comprising two upper protuberances jutting laterally from the slider block; a U-shaped ratchet lever disposed above a junction point of the distal end and the proximal end, the ratchet-lever comprising two inferiorly-descending prongs which straddle the distal end of the elongated band, the prongs defining an interior recess into which the two upper protuberances dispose above the lower protuberances; a rear block affixed to the proximal end of the elongated collar defining an aperture through which the distal end slidably travels; wherein the ratchet lever is adapted to rotate about the fulcrum and press forward, tightening the elongated band about a hose; a ratchet lever hingedly affixed to a fulcrum disposed above the band, the ratchet lever affixed at a midpoint to one or more of a spring and a tension bar, the ratchet lever adapted to be forced downwardly to dispose against the band and apply tensile force to the band when so positioned; a release mechanism, adapted to release the tightener from the band when activated.

The prongs may further comprise two sidewalls circumscribing the interior recess. In some embodiments, the track further comprises an upwardly-rising protuberance forming a dovetail joint with the slider block.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
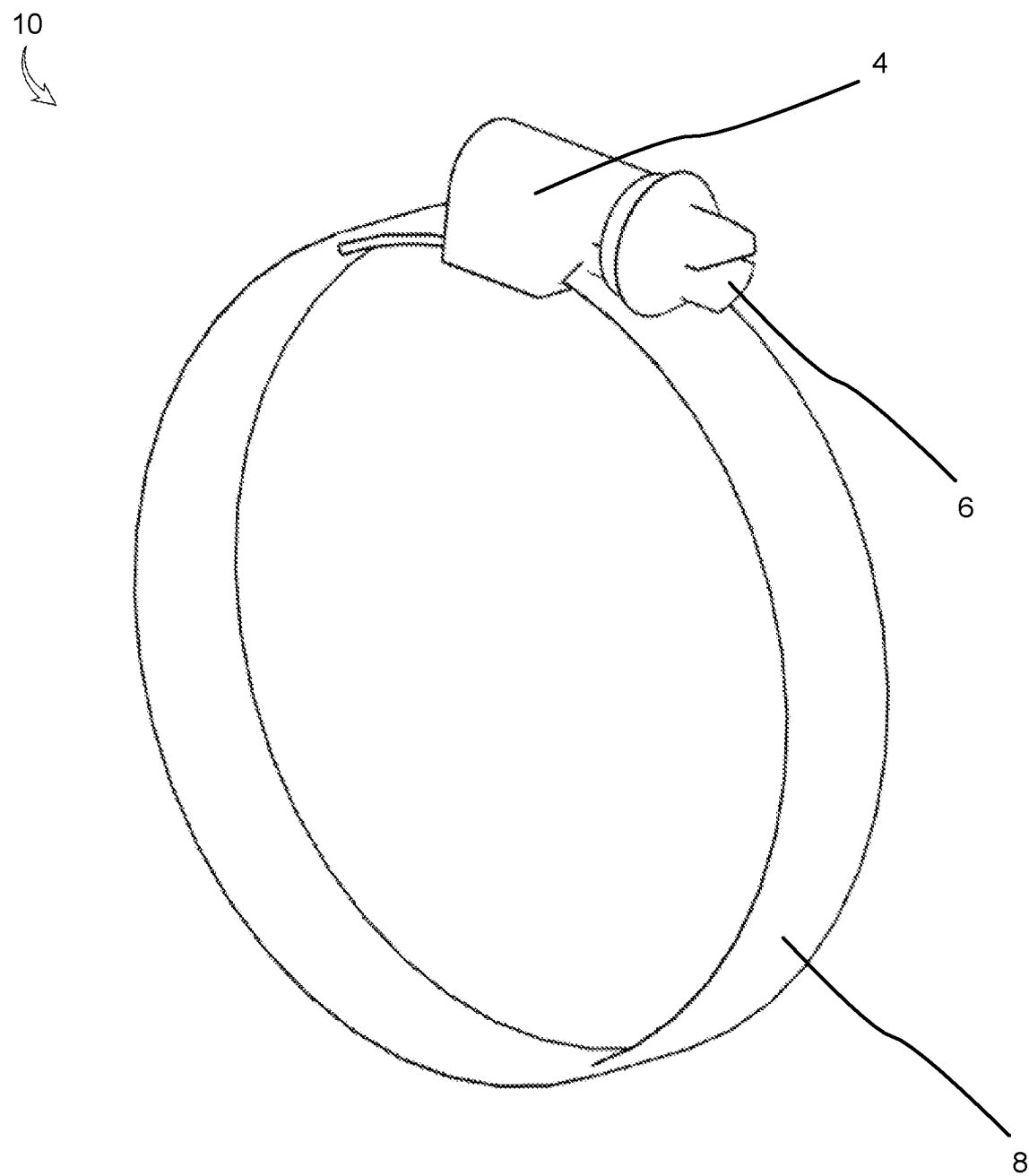
FIG. 1 is a forward perspective view of a traditional hose clamp in accordance with the prior art.
Figure 2:
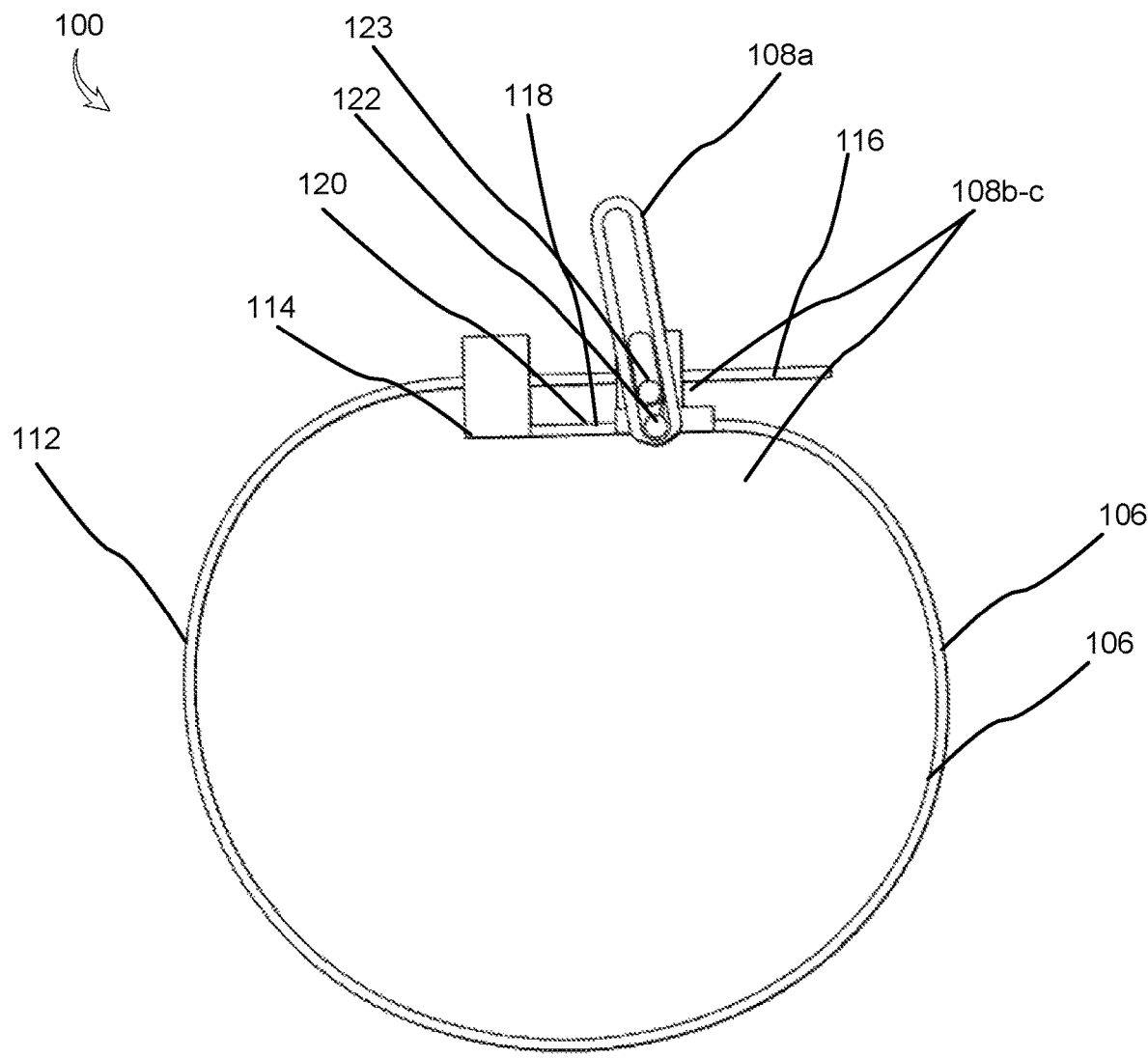
FIG. 2 is a forward, perspective view of one embodiment of an improved hose clamp in accordance with the present invention.
Figure 3:
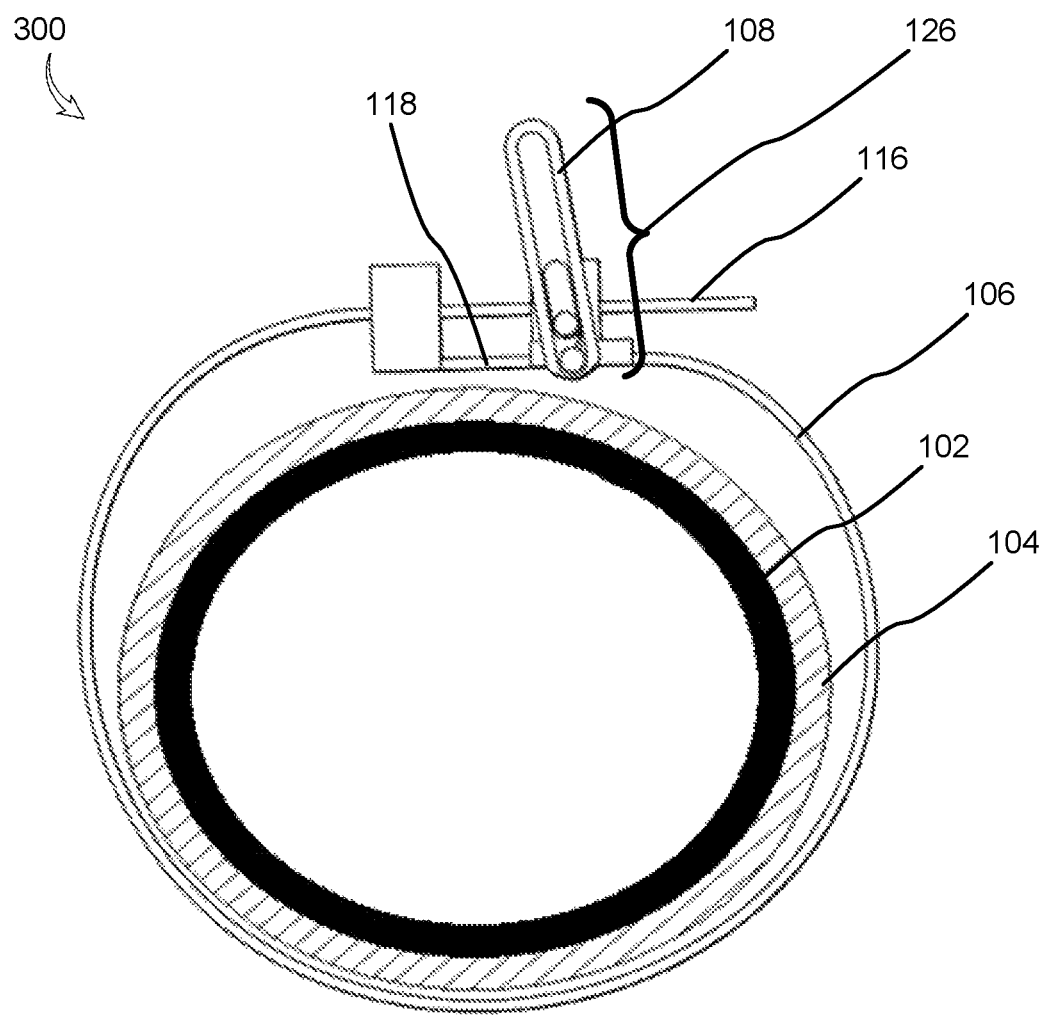
FIG. 3 is a forward, environmental perspective view of one embodiment of an improved hose clamp in accordance with the present invention.
Figure 4A:
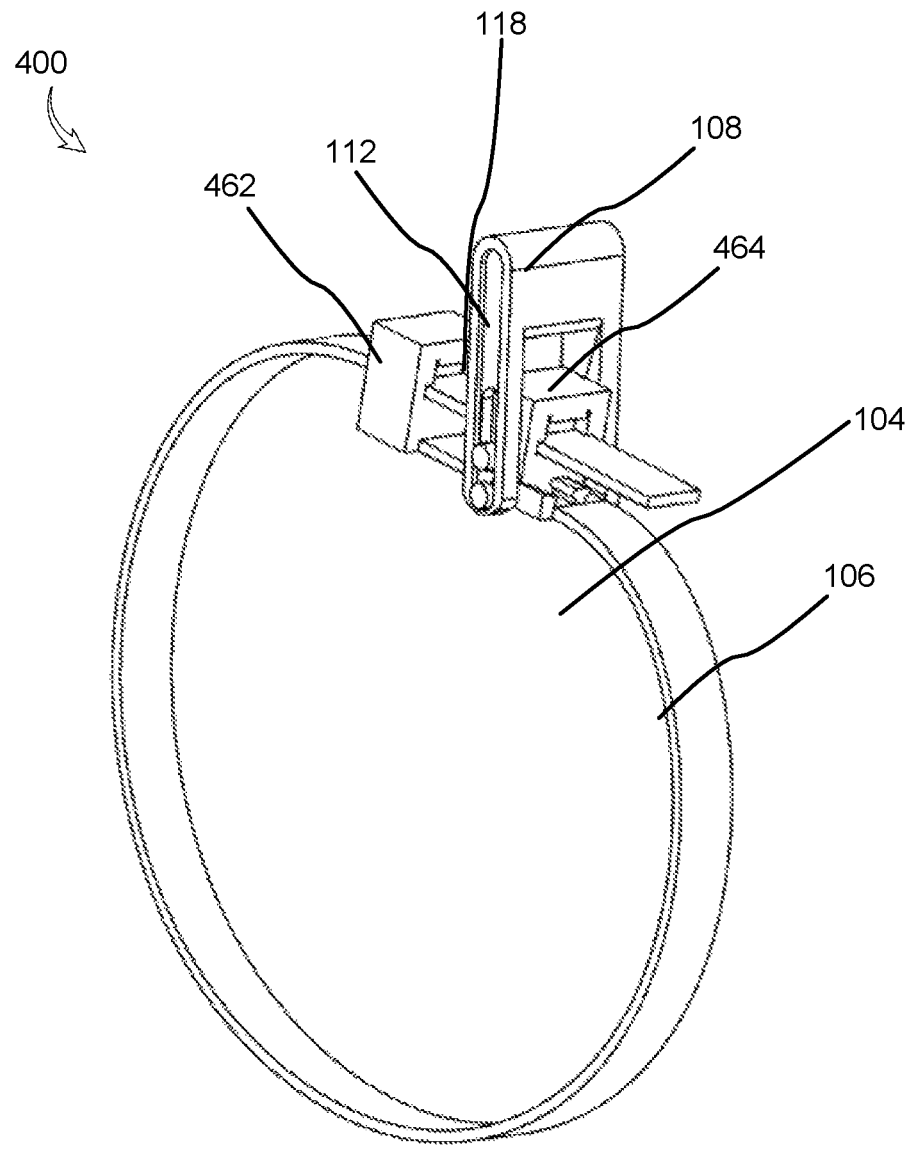
FIG. 4A is a side perspective view of one embodiment of an improved hose clamp in accordance with the present invention.
Figure 4B:
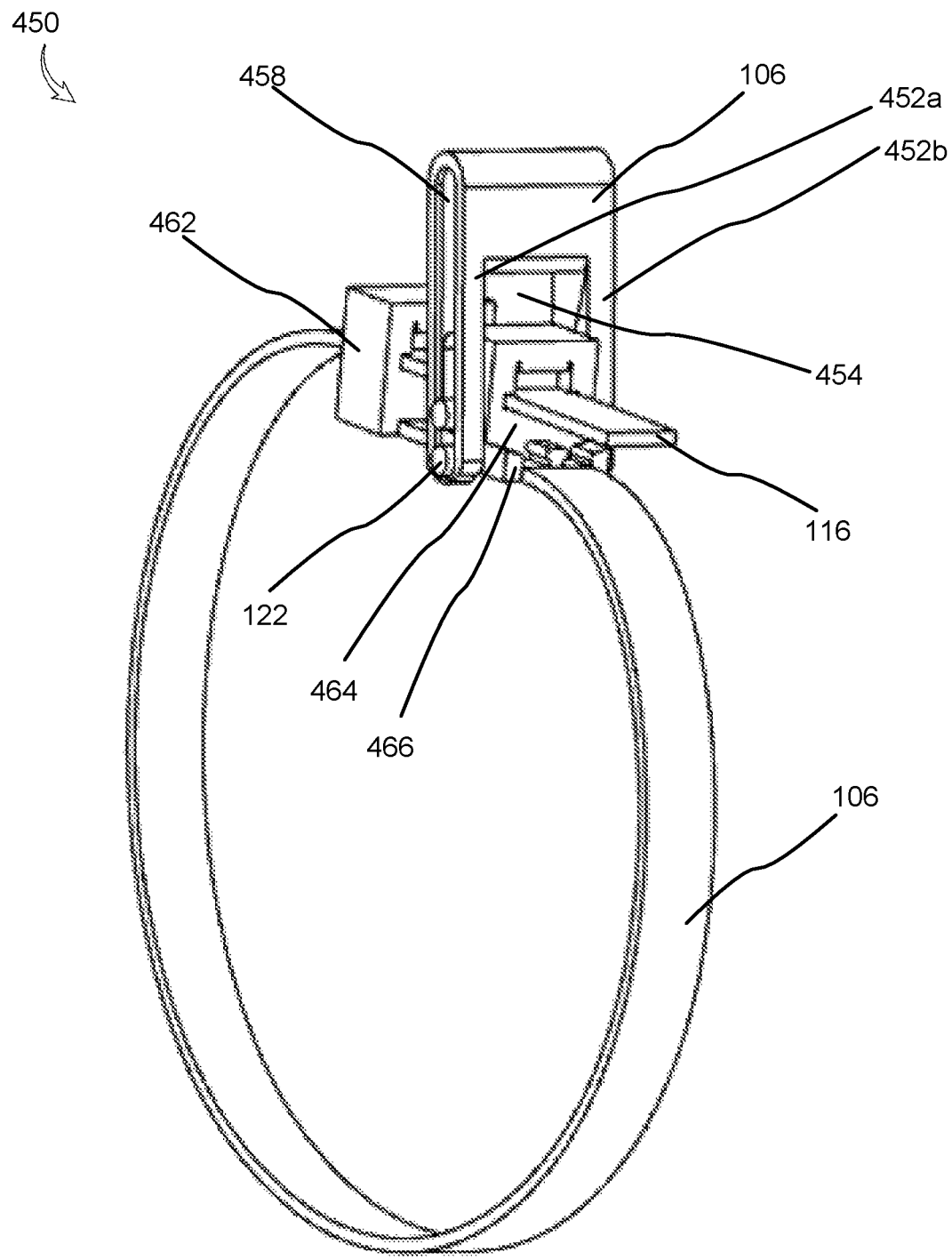
FIG. 4B is a side, environmental perspective view of one embodiment of an improved hose clamp in accordance with the present invention.
Figure 4C:
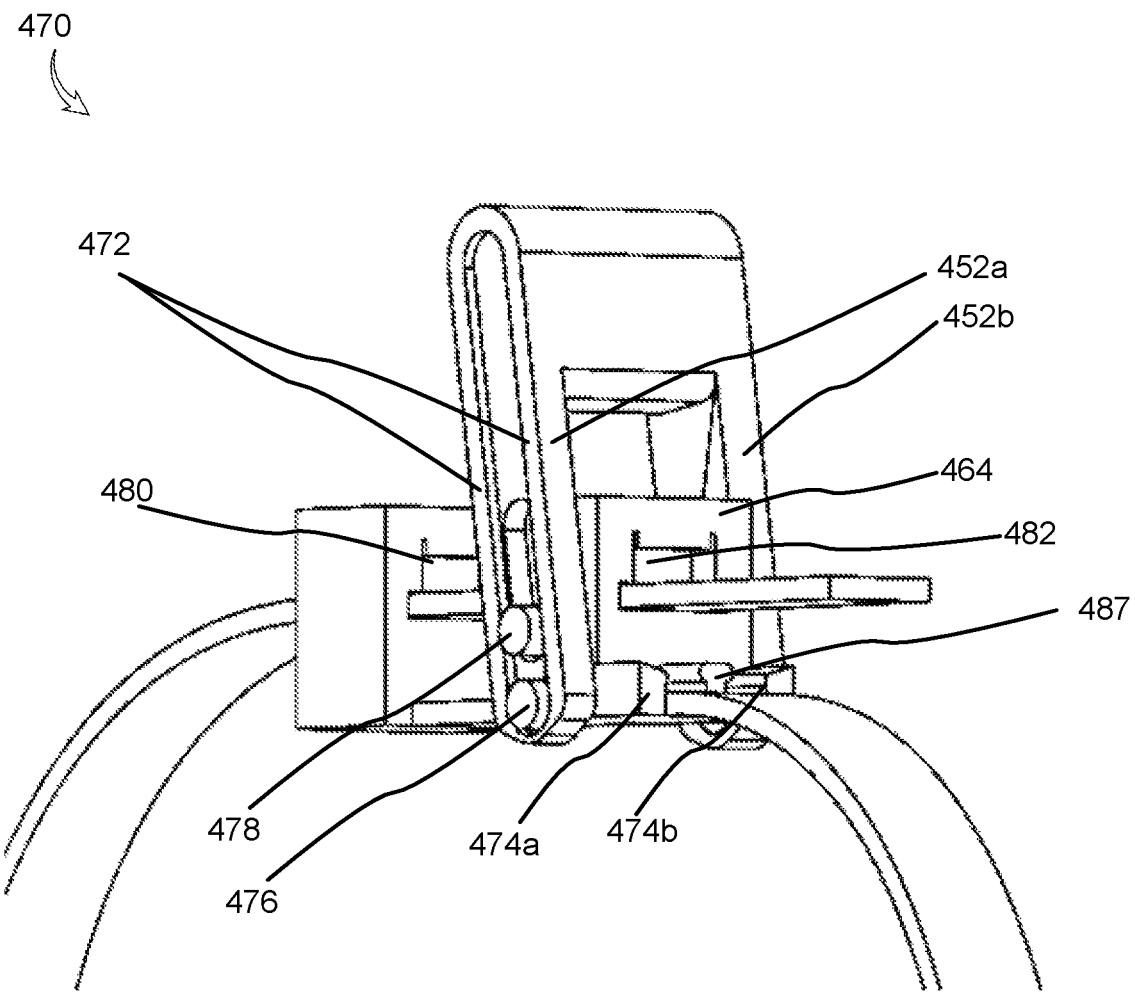
FIG. 4C is a side perspective view of one embodiment of an improved hose clamp in accordance with the present invention.
Figure 5:
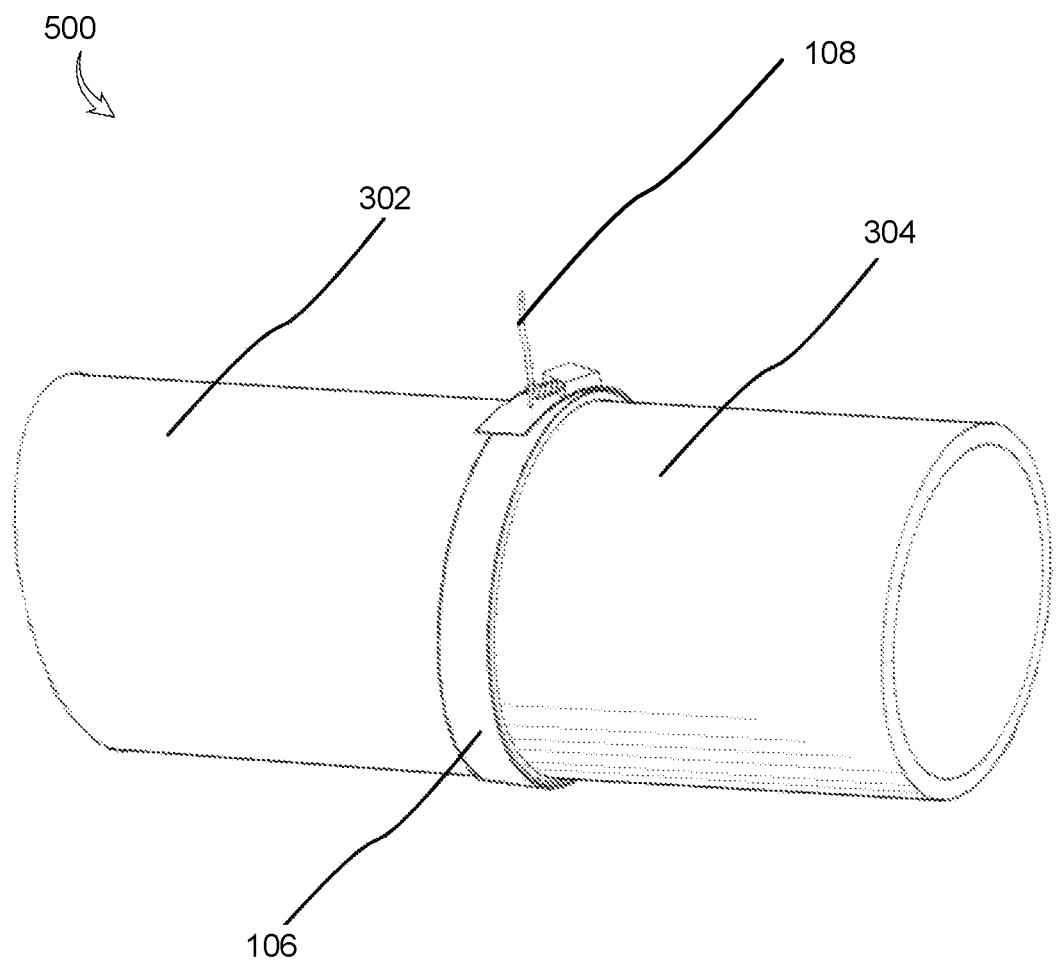
FIG. 5 is an environmental, side perspective view of one embodiment of an improved hose clamp in accordance with the present invention.

FIG. 1 is a forward perspective view of a traditional hose clamp 10 in accordance with the prior art.

The hose clamp 10 comprises an annular band or collar 8, formed of either a metal alloy and/or a polymeric material. The collar is deformed against a hose. In typical embodiments, these hose clamps are tightened using a jack screw 6, or threaded tightener, disposed above the band 8 at a junction point 4 between distal and proximal ends of the collar adapted to apply progressive clamping/tensile force to the band.

Hose clamps statically position a hose clamp 10 in close proximity to the end of hose 302 and resist tensile pull of the hose 302 which would otherwise separate the hose 302 from the attachment body 304.

FIGS. 2-5 illustrate perspective views of one embodiment of an improved hose clamp 100, 200, 300, 400 in accordance with the present invention.

The apparatus 100 comprises a semi-rigid band 106 (or collar 106) formed of a metal alloy, polymeric or organic material (such as leather). The band 106 is separated, or interrupted, having a distal end 116 and a proximal end 118.

The band 106 is deformed to form an annular ring, with the distal end 116 of the band 106 overlapping the proximal end 118 of the band 106. In other embodiments, the proximal end 118 overlaps the distal end 116.

A tightener assembly 126 positions, in some embodiments, above the junction point of the distal end 116 and the proximal end 118. The ratchet lever is indicated at 108.

The ratchet lever 108 is U-shaped (from a forward perspective), comprising two inferior prongs 452a-b. These inferior prongs 452a-b define a lever recess 454 between them in which a slider block 464 positions. In various embodiments, the ratchet lever 108 is oblong in shape from a side perspective view, having an ovoid annular sidewall 472 circumscribing an interior recess 458 defined by the sidewall 472.

As the ratchet lever 108 is pushed downwardly toward the collar/band 106 is tightened over the hose 104 and hose attachment point 102.

The ratchet lever 108 pivots about a lower fulcrum 122, which may be disposed superiorly the band 106 or coplanarly. The lower fulcrum 122 is formed by two lower protuberances 476, each jutting laterally from a track 466 and affixed thereto. The protuberances 476 position within the interior recess 458.

In various embodiments, the proximal end 118 of the collar 106 is affixed to a track 466. In various embodiments, the proximal end 118 of the collar 106 is permanently affixed to the track 466.

The track 466 may comprise a first track sidewall 474a and a second track sidewall 474b, which form a recess between them within which the slider block 464 travels.

The slider block 464 forms a recess 482 through which the distal end 116 of the collar 106 traverses. The slider block 464 may be formed from metal, metal alloy or polymeric components. In various embodiments, two upper protuberances 478 jut laterally from the slider block 464 and are affixed thereto. The upper protuberances 478 position within the recess 458 above the lower protuberances 476.

The apparatus 450 comprises a rear block 462. The rear block 462 is affixed to the proximal end 118 of the collar 106. The distal end 116 of the collar 106 passes through an aperture 480. The distal end 116 of the collar 106 is slidably positioned within the rear block 464.

When the ratchet lever 108 is pushed forward away from the rear block 462, pivoting about the fulcrum 122 comprising the lower protuberances 476, the slider block 464 travels forwardly within the track 466. As the ratchet lever 108 and the elongated recess 458 are angled forward, the upper protuberances 478 come into position forward of the lower protuberances 476; and, in some embodiments, inferiorly to the lower protuberances 476 (i.e., lower than the lower protuberances 476). The ratchet lever 108 may abut the top surface of the collar 106. In this configuration, the tensile force on the apparatus 470 created by the underlying hose 302 and/or attachment point 304, keep the lever 108 affixed in a forward configuration and the apparatus 470 effectively applies pressure to the hose 302, clamping around the same.

The track 466 may further comprise an upwardly-rising protuberance 487. In some embodiments, the upwardly rising protuberance 487 forms a joint with the slider block 464. This joint may be a dovetail joint. The slider block 464 travels across the upwardly-rising protuberance.

The ratchet lever 108 may hingedly affixed to a tension spring 112 and a tension bar 120. In various embodiments, the apparatus 500 comprises a tension spring.

The hose clamp 100-500 is tightened around the distal end of a hose 302 mounted over an attachment point 304. The attachment point 304 may be a pipe, tubing, or an otherwise cylindrical member.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An improved hose clamp comprising:
an elongated band formed into a cylindrical shape adapted to circumscribe a hose and attachment point, the band having a distal end and proximal end;
a track affixed to a proximal end of the elongated band, the track comprising:
two sidewalls within which a slider block travels;
two lower protuberances jutting laterally from the track disposed within an interior recess defined by a ratchet lever, the lower protuberances forming a fulcrum;
wherein the slider block is affixed to a distal end of the elongated band, the slider block forming a recess adapted to affix to the distal end of the elongated band, the slider block comprising two upper protuberances jutting laterally from the slider block;
a ratchet lever, the ratchet lever comprising two inferiorly-descending prongs which straddle the distal end of the elongated band, the prongs defining an interior recess into which the two upper protuberances are disposed above the lower protuberances;
a rear block affixed to the proximal end of the elongated collar defining an aperture through which the distal end slidably travels;
wherein the ratchet lever is adapted to rotate about the fulcrum and press forward, tightening the elongated band about a hose.

2. The hose clamp of claim 1, wherein the prongs further comprises two sidewalls circumscribing the interior recess.

3. The hose clamp of claim 1, wherein the track further comprises an upwardly-rising protuberance forming a dovetail joint with the slider block.

4. The hose clamp of claim 1, wherein the elongated band is formed from one of a metal alloy and a polymer.

5. An improved hose clamp comprising:
an elongated band formed into a cylindrical shaped adapted to circumscribe a hose and attachment point, the band having a distal end and proximal end;
a slider block affixed to a distal end of the elongated band, the slider block forming a recess adapted to affix to the distal end of the elongated band, the slider block comprising two upper protuberances jutting laterally from the slider block;
a ratchet lever disposed above a junction point of the distal end and the proximal end, the ratchet-lever comprising two inferiorly-descending prongs which straddle the distal end of the elongated band, the prongs defining an interior recess into which the two upper protuberances are disposed above the lower protuberances;
a rear block affixed to the proximal end of the elongated collar defining an aperture through which the distal end slidably travels;
wherein the ratchet lever is adapted to rotate about a fulcrum and press forward, tightening the elongated band about a hose;
wherein the ratchet lever is hingedly affixed to the fulcrum disposed above the band, the ratchet lever affixed at a midpoint to one or more of a spring and a tension bar, the ratchet lever adapted to be forced downwardly to dispose against the band and apply tensile force to the band when so positioned.

6. An improved hose clamp comprising:
an elongated band formed into a cylindrical shaped adapted to circumscribe a hose and attachment point, the band having a distal end and proximal end;
a slider block affixed to a distal end of the elongated band, the slider block forming a recess adapted to affix to the distal end of the elongated band, the slider block comprising two upper protuberances jutting laterally from the slider block;
a ratchet lever disposed above a junction point of the distal end and the proximal end;
a rear block affixed to the proximal end of the elongated collar defining an aperture through which the distal end slidably travels;
wherein the ratchet lever is adapted to rotate about a fulcrum and press forward, tightening the elongated band about a hose;
wherein the ratchet lever hingedly affixed to the fulcrum disposed above the band, the ratchet lever affixed at a midpoint to one or more of a spring and a tension bar, the ratchet lever adapted to be forced downwardly to dispose against the band and apply tensile force to the band when so positioned.

* * * * *